Patented Jan. 8, 1935

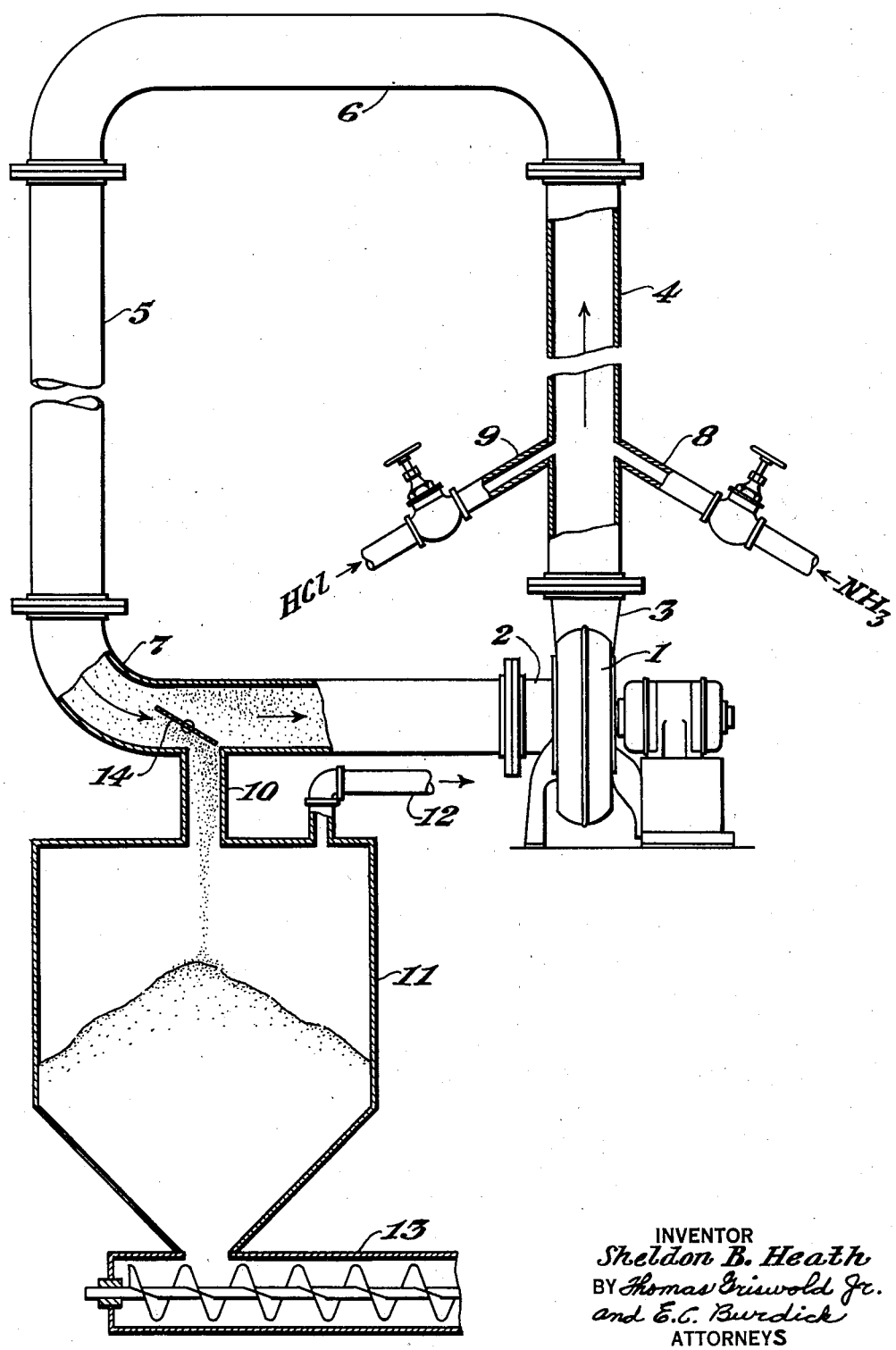

1,987,572

UNITED STATES PATENT OFFICE 1,987,572

PROCESS OF MAKING AMMONIUM CHLORIDE

Sheldon B. Heath, Midland, Mich., assignor to The Dow Chemical Company, Midland, Mich., a corporation of Michigan Application July 3, 1933, Serial No. 678,803

9 Claims. (Cl. 23—100)

This invention is concerned with the direct reaction of substantially dry ammonia and hydrogen chloride in vapor phase to produce ammonium chloride. The advantage of this general method of preparation, as is well known, is in the avoidance of handling aqueous solutions, from which, on account of their corrosiveness to metals, it is extremely difficult to crystallize a product free from metallic impurities.

There are well known difficulties, however, connected with carrying out the reaction in the vapor phase. For example, it leads to the formation of a "fog" consisting of impalpable particles which float in air and settle very slowly. On account of the excessively slow rate of production in proportion to the volume of reaction space which is obtained by this method at moderate reaction temperatures, it has been proposed to increase the rate of output by increasing the reaction temperature, e. g. to about 300° C., so that the product is formed as a fibrous crystalline mass like sublimed sal ammoniac. This change still does not permit of a very great increase in output, however, and the solid cake produced is not desirable for many industrial uses of ammonium chloride. Moreover, the reaction cannot be carried out at the required temperature in apparatus having metallic surfaces exposed to the reaction materials.

I have now found that the rate of reaction may be very greatly increased with only a moderate increase of temperature above normal by proceeding in the following described manner. According to my improved procedure the reacting materials, ammonia and hydrogen chloride, are introduced in proper combining proportions into a rapidly flowing current of a gas, either a substantially non-reactive gas, such as air, nitrogen, etc., or an excess of one of the reactants, which gas current is constantly recycled. The particles of ammonium chloride are held in suspension in the gas current while they grow in size until large enough to settle quickly by their own weight when their motion is arrested by causing them to impinge upon a surface of the apparatus which is interposed in their path. In this way the product is obtained in the form of fine grained particles more or less spherical in shape and quite uniform. The improved process can be carried out, at the temperatures employed, in apparatus constructed of a corrosion-resistant metal, or of one whose chloride is substantially non-volatile at the reaction temperature, without introducing metallic impurities into, or discoloring, the product. The following description sets forth in detail a preferred embodiment of the invention, which is explained with reference to the annexed drawing.

In said drawing, the single figure represents a form of apparatus suitable for carrying out the invention. A centrifugal fan 1 of usual type, having a gas inlet 2 and outlet 3, is connected in closed circuit with a duct system consisting of vertical members 4 and 5, a U connector 6 and a return duct 7, member 4 being directly connected to outlet 3 and return duct 7 to inlet 2 of the fan 1. In member 4 are valve controlled inlets 8 and 9 for ammonia and hydrogen chloride, respectively, being preferably inserted at an angle as shown. In the bottom of the horizontal portion of return duct 7 is a discharge outlet 10, preferably of smaller diameter than duct 7. Outlet 10 communicates with a closed receiver 11 provided with a gas vent 12. Receiver 11 feeds into a conveyor 13, by which the product is removed to storage or for packaging. In duct 7 may be placed a baffle or deflector 14 which can be made adjustable by being pivoted preferably at a point offset forward of the center of the outlet 10. Suitable gauges and measuring instruments for determining the temperature, velocity, composition, etc. of the circulating gases, may be provided as desired.

In the operation of the apparatus the fan is driven at a speed to maintain a sufficient air velocity in the duct system, which in practice is varied between about 2000 and 5000 feet or more per minute, although these figures are not to be regarded as limiting the invention. The circulating gases are heated by the heat of reaction, but the temperature is maintained between about 100° and about 200° C. by regulating the rate of introducing the ammonia and hydrogen chloride. By providing for rapid radiation of heat from the apparatus, its capacity may be considerably increased. The fan and pipes may be constructed of metal which preferably is not covered with any heat insulation, so as to radiate heat freely to the outside. While this method of cooling and maintaining a sufficient temperature control is to be preferred on account of its simplicity, I do not limit myself thereto, but may employ any suitable cooling means for preventing excessive rise of temperature.

To start the process the fan is set in motion, and a small quantity of granular ammonium chloride is charged into the system where it is suspended in the air current. Ammonia and hydrogen chloride are then admitted in about combining proportions and react promptly to form ammonium chloride, which is carried in suspension by the air current and continuously recirculated, while the particles gradually grow in size, either by agglomeration or by deposition of ammonium chloride upon particles already formed. As the formation of ammonium chloride and the growth of the particles continues, the loading of the air current increases to the point where the heavier particles commence to settle out and are discharged through outlet 10. The separation of the particles is assisted by the deflector 14, against which some of the suspended particles constantly strike and are caused to settle out by the sudden stoppage of their motion. Deflector 14 may be adjusted at various angles to control the deposition of the heavier particles, thereby affording a degree of control of the size of the particles discharged.

By maintaining the temperature in the system at a point below that at which ammonium chloride has a material vapor pressure, the sublimation of the product and formation of a solid coating of sublimed material on the duct surfaces is largely avoided, as already indicated, temperatures below about 200° C. being satisfactory. An additional aid to the prevention of caking in the pipes, I have found, is the scouring or eroding action of the granular ammonium chloride particles which are carried by the recirculating gas current. These particles, due to their rapid motion, act similarly to a sand blast to keep the duct surfaces scoured clean, while the hardness of the particles is not sufficient to cause erosion of the metal itself. The addition of a small amount of solid ammonium chloride particles in starting operation of the process, as aforementioned, is instrumental in keeping the metal surfaces scoured until the newly formed particles are built up to a large enough size to continue this action.

As a practical example of the working of my improved process, a duct system was employed composed of 8 inch diameter pipe made of a magnesium-manganese alloy containing 1.5 per cent of manganese, the total length of piping being 18 feet. The fan was operated at a speed to maintain a gas velocity of about 4800 feet per minute in the system, and ammonia and hydrogen chloride were admitted at a rate to produce from 16 to 21 pounds of ammonium chloride per hour. At this operating rate the temperature varied from about 100° to about 130° C. The product, which settled out in the form of small shot having a size up to about $\frac{1}{16}$ inch, was white in color, free from heavy metal impurities and contained 99.7 per cent NH₄Cl.

In the foregoing example the reacting gases were nearly anhydrous, the ammonia being substantially 100 per cent pure, while the hydrogen chloride was about 80 per cent pure, being diluted with air. It is desirable to employ nearly dry gases, although a trace of water seems to be necessary to catalyze the reaction. Since some air is continuously vented from the system, it is feasible to employ gases containing an appreciable amount of water vapor, the excess water vapor being vented from the system with the air, while the reaction temperature is maintained at a point to prevent condensation of moisture.

When it is desired to carry out the process under conditions where strong hydrogen chloride gas is not readily available, the hereinbefore described procedure may be modified to permit the use of chlorine instead of hydrogen chloride. Chlorine reacts with ammonia to form hydrogen chloride, according to the equation;

(1) $3Cl_2 + 2NH_3 \rightarrow 6HCl + N_2$

The hydrogen chloride in the presence of ammonia then forms ammonium chloride, the complete equation being;

(2) $3Cl_2 + 8NH_3 \rightarrow 6NH_4Cl + N_2$

If insufficient ammonia is present to satisfy Equation (2), a mixture of hydrogen chloride and ammonium chloride is formed. Small amounts of nitrogen chloride or chloramines, which discolor the ammonium chloride product, may also be formed in side reactions, unless the temperature is raised to about 300° C. At such temperatures the ammonium chloride is largely dissociated into hydrogen chloride and ammonia, which recombine upon cooling. A temperature as high as 300° C., or thereabout, is not suitable for the process of this invention, as it would prevent separation of solid particles in the manner already described and also subject the metallic parts of the apparatus to attack. In order to adapt the use of chlorine, instead of hydrogen chloride, as primary raw material in my process, I may react chlorine with less ammonia than corresponds to Equation (2) at about 300° C. in a separate reactor not shown in the drawing, and then introduce the hot gaseous mixture of ammonium chloride, hydrogen chloride and nitrogen through inlet pipe 9 into the apparatus, where it intermixes with cold ammonia introduced through inlet 8, as well as with the recirculated gases, to lower the temperature of the combined gases to a point below 200° C. Thence the operation proceeds in the manner already described, the excess nitrogen formed in the reaction of chlorine and ammonia being vented at 12.

The apparatus employed in my improved process, such as fan, pipes, etc. may be made of any corrosion-resistant metal, or of one whose chloride has no appreciable vapor pressure at the reaction temperature. Ordinary iron and aluminum are undesirable, since the respective chlorides are sufficiently volatile to carry over metallic impurity into the ammonium chloride product. I have found magnesium, or magnesium base alloys, especially suitable for the purpose, and prefer to use apparatus constructed from this metal. However, other metals resistant to attack, such as high chromium irons, nickel, nichrome, etc. may be employed, as well as other resistant materials, such as enameled iron or ceramic tile and the like.

Other ammonium halides, particularly ammonium bromide, may also be made by reacting gaseous ammonia and hydrogen bromide in accordance with the hereinbefore described process.

Other modes of applying the principle of my invention may be employed instead of the one explained, change being made as regards the process herein disclosed, provided the step or steps stated by any of the following claims or the equivalent of such stated step or steps be employed.

I therefore particularly point out and distinctly claim as my invention:—

1. Process of making ammonium chloride which comprises the step of reacting gaseous ammonia and hydrogen chloride in a rapidly flowing continuously recirculated gaseous current containing small particles of ammonium chloride suspended therein.

2. Process of making ammonium chloride which comprises rapidly circulating in a closed system a gaseous current containing small granular particles of ammonium chloride suspended therein and adding ammonia and hydrogen chloride to the current.

3. Process as claimed in claim 2, in which the supply of hydrogen chloride is intermixed with ammonium chloride previously formed by reaction of ammonia and chlorine.

4. Process of making ammonium chloride which comprises rapidly circulating in a closed system a non-reactive gaseous current containing small granular ammonium chloride particles suspended therein, adding ammonia and hydrogen chloride in approximately combining proportions at a rate such as to maintain the temperature of the system between about 100° and 200° C. and continuously removing a portion of the ammonium chloride particles from said current.

5. Process of making ammonium chloride which comprises reacting gaseous ammonia and hydrogen chloride in a rapidly flowing current of a non-reactive gas containing small granular particles of ammonium chloride suspended therein, continuously recirculating the gases while additional particles are formed therein, arresting the motion of a portion of the suspended particles to cause the same to settle out and removing the separated particles.

6. In a process of making ammonium chloride by reacting gaseous ammonia and hydrogen chloride in a rapidly flowing current of a non-reactive gas at a temperature below about 200° C., the improvement which consists in carrying out the process in contact with surfaces of magnesium or a magnesium base alloy.

7. Process of making an ammonium halide which comprises rapidly circulating in a closed system a non-reactive gaseous current containing small granular particles of the halide suspended therein and adding ammonia and the corresponding hydrogen halide to the current.

8. Process of making ammonium bromide which comprises rapidly circulating in a closed system a non-reactive gaseous current containing small granular particles of the bromide suspended therein and adding ammonia and hydrogen bromide to the current.

9. Process of making ammonium bromide which comprises circulating in a closed system a non-reactive gaseous current containing small granular ammonium bromide particles suspended therein, adding ammonia and hydrogen bromide in approximately combining proportions at a rate such as to maintain the temperature of the system between about 100° and 200° C., and continuously removing a portion of the ammonium bromide particles from said current.

SHELDON B. HEATH.